US008457317B2

(12) United States Patent
Shaw

(10) Patent No.: US 8,457,317 B2
(45) Date of Patent: Jun. 4, 2013

(54) METHOD FOR DATA PRIVACY IN A FIXED CONTENT DISTRIBUTED DATA STORAGE

(75) Inventor: David M. Shaw, Newton, MA (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 1127 days.

(21) Appl. No.: 12/116,274

(22) Filed: May 7, 2008

(65) Prior Publication Data

US 2008/0285759 A1     Nov. 20, 2008

Related U.S. Application Data

(60) Provisional application No. 60/916,478, filed on May 7, 2007.

(51) Int. Cl.
    *H04L 9/08*     (2006.01)
(52) U.S. Cl.
    USPC ........... 380/278; 380/277; 380/282; 380/286; 380/46; 713/156; 713/168; 713/173; 713/178; 705/51; 705/57
(58) Field of Classification Search
    USPC .... 380/277–278, 201, 282, 286, 46; 713/168, 713/156, 173, 178; 705/57, 51
    See application file for complete search history.

(56) References Cited

U.S. PATENT DOCUMENTS

| 7,093,021 B2 * | 8/2006 | Blumenau et al. ............ 709/229 |
| 2002/0012433 A1 | 1/2002 | Haverinen et al. |
| 2002/0118674 A1 | 8/2002 | Faccin et al. |
| 2003/0084290 A1 * | 5/2003 | Murty et al. .................. 713/168 |
| 2003/0147535 A1 * | 8/2003 | Nadooshan et al. .......... 380/277 |
| 2004/0039924 A1 | 2/2004 | Baldwin et al. |

(Continued)

FOREIGN PATENT DOCUMENTS

| JP | 2002312242 A | 10/2002 |
| JP | 2003333027 A | 11/2003 |

(Continued)

OTHER PUBLICATIONS

APSS: Proactive Secret Sharing in Asynchronous Systems; Lidong Zhou;ACM Transactions on Information and System Security, vol. 8, No. 3, Aug. 2005.*

(Continued)

*Primary Examiner* — Taghi Arani
*Assistant Examiner* — Angela Holmes
(74) *Attorney, Agent, or Firm* — David H. Judson

(57) ABSTRACT

An archival storage cluster of preferably symmetric nodes includes a data privacy scheme that implements key management through secret sharing. In one embodiment, the protection scheme is implemented at install time. At install, an encryption key is generated, split, and the constituent pieces written to respective archive nodes. The key is not written to a drive to ensure that it cannot be stolen or otherwise compromised. Due to the secret sharing scheme, any t of the n nodes must be present before the cluster can mount the drives. Thus, to un-share the secret, a process runs before the cluster comes up. It contacts as many nodes as possible to attempt to reach a sufficient t value. Once it does, the process un-shares the secret and mounts the drives locally. Given bidirectional communication, this mount occurs more or less at the same time on all t nodes. Once the drives are mounted, the cluster can continue to boot as normal.

12 Claims, 4 Drawing Sheets

U.S. PATENT DOCUMENTS

| | | | |
|---|---|---|---|
| 2004/0197079 | A1 | 10/2004 | Latvala et al. |
| 2005/0120025 | A1* | 6/2005 | Rodriguez et al. ............. 707/10 |
| 2005/0223008 | A1 | 10/2005 | Kubota et al. |

FOREIGN PATENT DOCUMENTS

| | | | |
|---|---|---|---|
| JP | 2003348065 A | | 12/2003 |
| JP | 2004355268 A | | 12/2004 |
| JP | 2005293004 A | | 10/2005 |
| KR | 1020060050505 | | 5/2006 |
| WO | 2005043323 A2 | | 5/2005 |

OTHER PUBLICATIONS

Multipath key exchange on P2P networks Takano, Y.; Isozaki, N.; Shinoda, Y. Availability, Reliability and Security, 2006. ARES 2006. The First Internatioal Conference on (0-7695-2567-9) 2006. p. 8 pp.*

Research on Key Management Infrastructure in Cloud Computing Environment Sun Lei; Dai Zishan; Guo Jindi. Grid and Cooperative Computing (GCC), 2010 9th International Conference on (978-1-4244-9334-0) 2010. p. 404-407.*

A self-encryption based private storage system over P2P distributed file sharing infrastructure Eiido, H.; Kawahara, Y.; Asami, T. Innovations in NGN: Future Network and Services, 2008. K-INGN 2008. First ITU-T Kaleidoscope Academic Conference (978-92-61-12441-0);2008. p. 69-76.*

* cited by examiner

```
2007-04-17 16:19:07,955 INFO    at commander.py line 310 starting encryption keywrite server on remote nodes
2007-04-17 16:19:08,134 INFO    at commander.py line 174 executing crypto keygeneration on ['192.168.144.165'] node.
========================

The following is your encryption key, please write this key down
per the documented escrow instructions for these keys and supply
the document to the customer per the key escrow instructions. Loss
of this key may render the data on the cluster inaccessible in
the case of a disaster recovery event.
FFF24B406D64CC8AA7EC49C073B45286
========================

Please retype the key in exactly as shown for confirmation [Default: None] : FFF24B406D64CC8AA7EC49C073B45286

2007-04-17 16:20:38,178 INFO    at commander.py line 325 installing keyserv daemon on remote nodes
```

*FIG. 4*

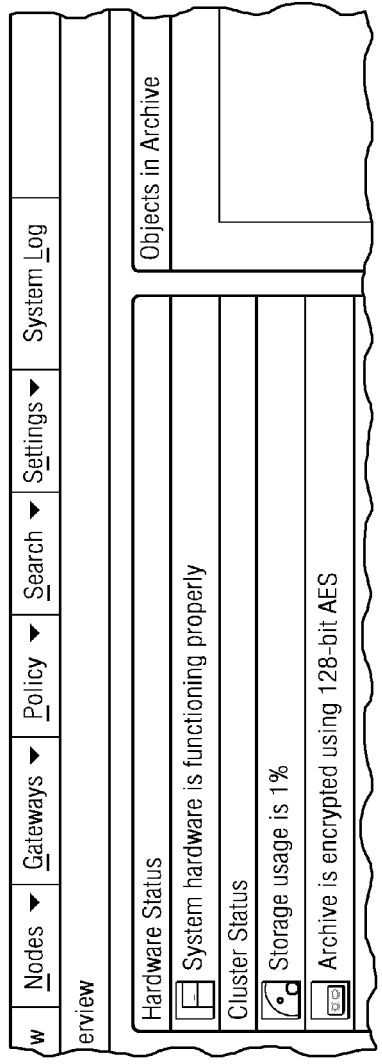

METHOD FOR DATA PRIVACY IN A FIXED CONTENT DISTRIBUTED DATA STORAGE

This application is based on Ser. No. 60/916,478, filed May 7, 2007.

CROSS-REFERENCE TO RELATED APPLICATIONS

This application is related to application to:

Ser. No. 11/190,402, filed Jul. 27, 2005, titled "Metadata Management for Fixed Content Distributed Data Storage;" and Ser. No. 11/638,252, filed Dec. 13, 2006, titled "Policy-Based Management of a Redundant Array of Independent Nodes."

BACKGROUND OF THE INVENTION

1. Technical Field

The present invention relates generally to techniques for highly available, reliable, and persistent data storage in a distributed computer network.

2. Description of the Related Art

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

As described in commonly-owned U.S. Pat. No. 7,155,466, it is known in a RAIN-based archival system to incorporate a distributed software application executed on each node that captures, preserves, manages, and retrieves digital assets. FIG. 2 illustrates one such system. A physical boundary of an individual archive is referred to as a cluster. Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

BRIEF SUMMARY OF THE INVENTION

This disclosure provides a technique to improve data privacy in a scalable disk-based archival storage management system. In one embodiment, this object is achieved by transparently encrypting content (and, if desired, metadata) stored to the archive. This operation protects against the content (and/or metadata) being recovered from stolen archive media (e.g., a disk), or from being obtained improperly by third parties (e.g., technicians, or other service personnel) who have been granted access to the archive.

In an illustrative embodiment, the protection scheme using a distributed key management solution based on a "secret sharing" protocol. The basic idea behind secret sharing is that a secret (i.e., a key) is broken into n pieces, any t of which can be used to reconstruct the key. Preferably, the protection scheme is implemented at install time. In particular, at this time, the encryption key is generated, split, and the constituent pieces written to the archive nodes. After sharing, the key may be printed out but, typically, it will not be stored to disk anywhere in the cluster. This ensures that the key is not written to a drive that may be stolen or otherwise compromised. Thus, in this embodiment, the key is generated and split into a set of shares, which shares are then each sent to individual nodes. As noted above, due to the secret sharing scheme, any t of the n nodes must be present before the cluster can mount the drives. Thus, to un-share the secret, a process runs before the cluster comes up. It contacts as many nodes as possible to attempt to reach a sufficient t value. Once it does, the process un-shares the secret and mounts the drives locally. Given bidirectional communication, this mount occurs more or less at the same time on all t nodes. Once the drives are mounted, the cluster can continue to boot as normal.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 illustrates an output of a key generation program according to this disclosure;

FIG. 5 illustrates how the system provides an indication of the encryption according to this disclosure.

DETAILED DESCRIPTION OF AN ILLUSTRATIVE EMBODIMENT

Figure 1:
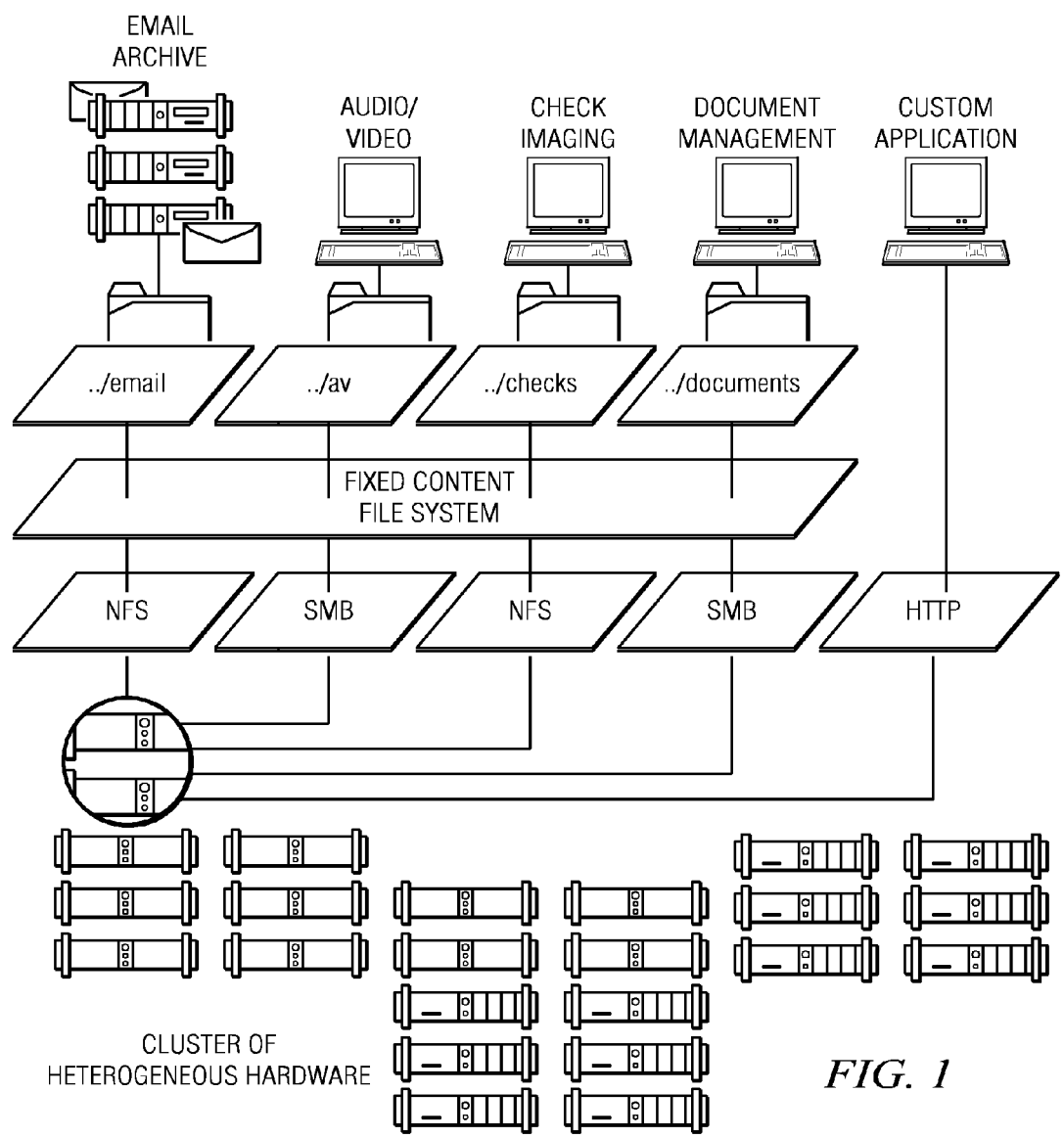
FIG. 1 is a simplified block diagram of a fixed content storage archive in which the disclosed subject matter may be implemented.
Figure 2:
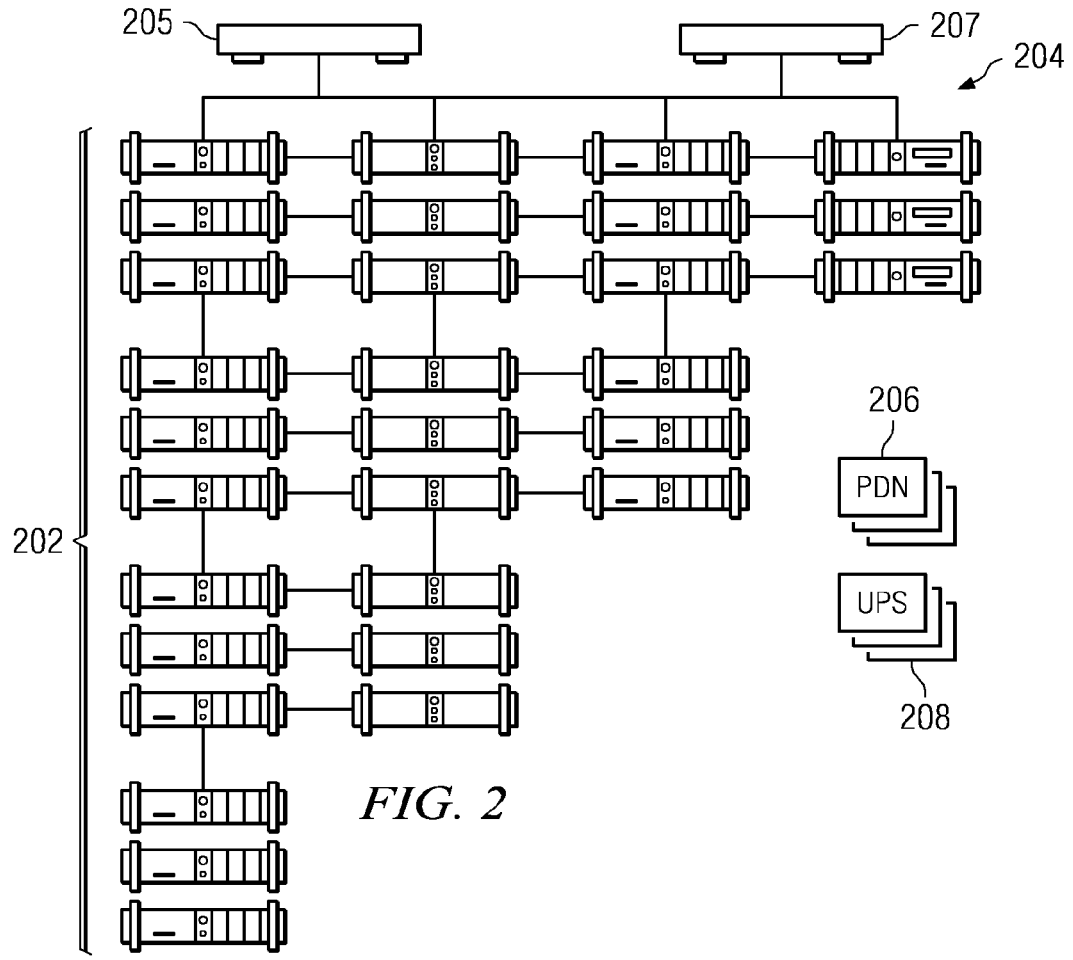
FIG. 2 is a simplified representation of a redundant array of independent nodes each of which is symmetric and supports an archive cluster application according to the present invention.

As seen in FIG. 2, an illustrative cluster in which the subject matter herein is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include: NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which is comprised of several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. This operation is described in more detail below. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse local directly structures.

Figure 3:
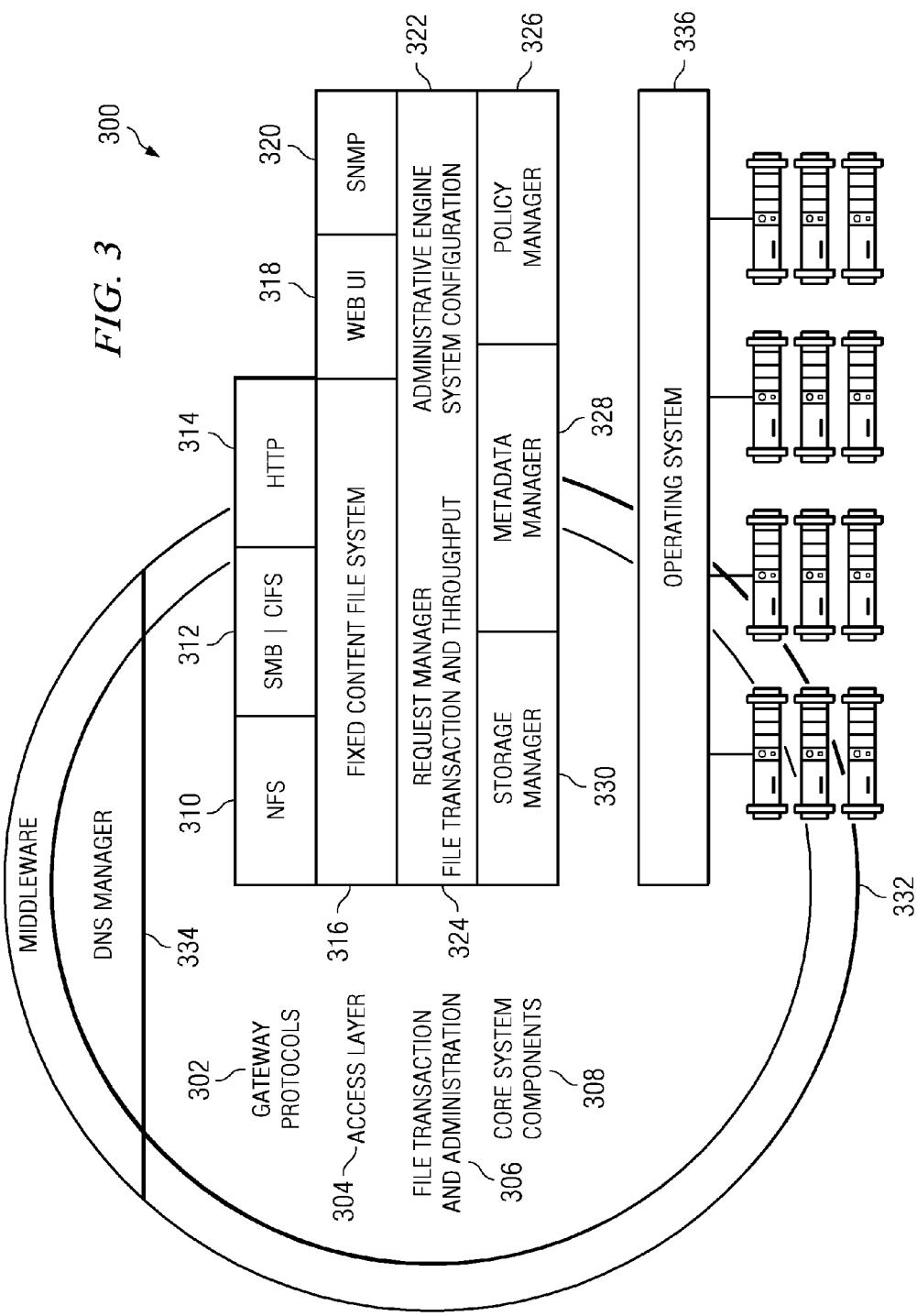
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the ArC application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file it generates a full path and file name for the representation for which it will be responsible. In a representative embodiment, each object to be stored on a storage manager is received as raw data to be stored, with the storage manager then adding its own metadata to the file as it stores it to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type) and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager also ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files.

Data Protection

According to the subject matter described herein, a data privacy scheme encrypts content and metadata written to an individual node in the archive. The technique preferably implements key management through secret sharing. In one embodiment, the protection scheme is implemented at install time. At install, an encryption key is generated, split, and the constituent pieces written to respective archive nodes. The key is not written to a drive to ensure that it cannot be stolen or otherwise compromised. Due to the secret sharing scheme, any t of the n nodes must be present before the cluster can mount the drives. Thus, to un-share the secret, a process runs before the cluster comes up. It contacts as many nodes as possible to attempt to reach a sufficient t value. Once it does, the process un-shares the secret and mounts the drives locally. Given bidirectional communication, this mount occurs more or less at the same time on all t nodes. Once the drives are mounted, the cluster can continue to boot as normal.

In one embodiment, the encryption key is broken up and distributed across a configurable number of nodes in the archive. Preferably, a given drive has a key share associated therewith, although there may not be a 1:1 correspondence between key shares and drives. At a particular drive, the key share transparently encrypts all content and metadata written to the drive. Also, preferably a search index for the drive is also encrypted. This technique provides data protection, and it has an advantage of not requirement content to be encrypted (e.g., using a third party application) external to the archive itself. In this manner, the encryption is transparent to the user.

During install, preferably the generated key is displayed so that the user can write the key down and save it in a safe location (preferably external to the archive). The key can be used to recover data from any disk in the archive, but preferably it is not stored in the archive disks. Thus, preferably the key is never written to disk but it only displayed (and then only during initial install). The key preferably is not available via the user interface or otherwise during use. The key may be kept in locked memory (i.e., memory that cannot be swapped) in the system and, as noted above, the key can only be reconstructed by the system with a quorum (e.g., n/2+1) of the drives. If the key cannot be reconstructed the cluster will not start and the data will not be accessible. Preferably, the swap space on encrypted systems is also encrypted to avoid data exposure.

The present invention protects against hardware (i.e., disk) theft, and/or entities that exceed permitted access to the archive. Thus, for example, the feature is intended to protect against a thief who can arrange physical access to the cluster, removing hard drives (or even complete nodes) and leaving with them. A goal is to render these stolen hard drives useless to the thief.

On startup, before the disks are mounted, the key is required. Rather than requiring manual or automated entry of a passphrase (or the like), as noted above, the present invention preferably implements a secret sharing protocol. Secret sharing is a known cryptographic protocol, wherein a secret is broken into n pieces, any t of which can be used to reconstruct the key. Preferably, each drive is installed with one piece of the key. A thief (or other unauthorized person or entity) would have to steal (or exceed access rights with respect to) t drives before he or she could get access to useful data. Of course, the archive also is unable to come up without t drives being present, so it is in the interest of the archive user to balance t between convenience and security. To un-share the secret, a process is executed before the cluster comes up, but this sequence is not required. This process should be run before the disks are mounted. The process contacts as many other nodes as possible. Once it reaches a sufficient t value, the process un-shares the secret and mounts the drives locally. Using bidirectional communication (e.g. multicast or broadcast over a set of backend links), this mount may take place at more or less the same time on all t nodes. Once the drives are mounted, the cluster continues to boot normally.

At a given disk, preferably an encrypted block device driver is layered on top of an existing device. By layering the driver on top of a disk partition, that partition becomes encrypted as data is written. Likewise, data cannot be read without the key.

The following provides additional details of the technique.

Details regarding secret sharing are described several well-known publications, which are incorporated herein by reference. These include: Shamir, "How to share a secret," *Communications of the ACM*, volume 22, pp. 612-613, ACM, 1979, Blakley, "Safeguarding cryptographic keys," in *Proceedings of AFIPS* 1979, volume 48, pp. 313-317, June 1979.

Figure 6:
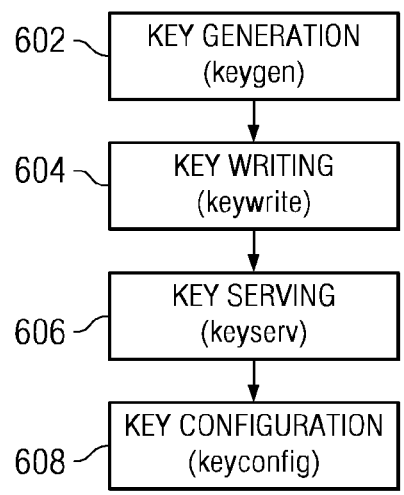
FIG. 6 illustrates the programs that comprise an illustrative embodiment.

A key is generated with a key generation (keygen) program. The keygen program 602 (FIG. 6) reads a configuration file to determine an appropriate key length (e.g., 32 bytes for a 256-bit key). Keys are random data. Keygen 602 takes several command line arguments, including a threshold, which defines a minimum number of nodes that must be present before the split key can be rejoined. If a threshold is not provided, preferably a default is set equal to the number of shares generated (i.e., the number of nodes). After threshold, keygen takes one or more IP addresses of nodes to which the key share(s) are to be sent. After sharing the key, keygen prints out and/or displays (but does not store) the generated key for escrow purposes. FIG. 4 is illustrative of this operation. As noted above, preferably neither the key nor any key data is stored on any disk, where it might otherwise be stolen or compromised. For example, the following represents a set of command line arguments:

Keygen—threshold 2 {10.1.1.10, 10.1.1.11, 10.1.1.1, 10.1.1.13}

In this example, the key is split into four (4) shares that are then sent to the four identified nodes. Of course, in practice there may be many more key shares. According to the key sharing protocol, in this example, any two (2) of the nodes are all that must be present before the cluster can mount the drives. In practice, the threshold will be set at a higher value.

The key data sent by the keygen program is listened for on each node by a second program that manages key writing. This program, called keywrite 604, writes the key data to a given configuration file (e.g., /crypt-share on the node. Preferably, keywrite is started by the install and once it writes the share file, the program exits. As keywrite 604 preferably does not run under normal circumstances (i.e., at other than install), this provides an extra barrier against accidental re-keying of the cluster. In effect, keywrite is essentially a file copy program. Preferably, and as with the other programs that facilitate the encryption scheme, the keywrite program 604 cannot perform a memory swap. Once the share data is dropped off, keywrite exits.

At boot-time, a daemon process, called keyserve, is started. The keyserv process 606 preferably communicates over multicast to send messages to other keyserv processes on the cluster. Keyserv 606 reads the /crypt-share configuration file and, like the keygen program, takes a threshold argument. The keygen may or may not store the threshold in the configuration file.

On the individual disk, an initialization script handles disk mounting. According to the inventive scheme, an additional initialization script is added and assigned a higher priority (i.e., to run earlier). This script may be stored in a key configuration (keyconfig) program 608. The keyconfig program may also be used to specify which cryptographic cipher (e.g., AES (also known as Rijndael), Anubis, Arc4, Blowfish, Cast5, Cast6, DES, TripleDES, Khazad, Serpent, TEA/XTEA/XETA, Twofish, and the like) to use for the encryption. The encryption mode, regardless of cipher or key length, preferably is cipher block chaining (CBC), although this is not a requirement. In normal use, keyconfig takes two arguments: the original device, and a new device name. Keyconfig contacts keyserv and requests the key. If keyserv has the key already unshared, keyserv returns it. If keyserv does not yet have the key, keyserv sends out a multicast message to the other nodes asking for their shares, which are then rejoined into the full key. One it has the key, keyconfig creates a device-mapper entry, e.g., using a crypt target. The new device name becomes the block device that can then be used by the disk mounting script to mount the drives. From that point onwards, this new device can be used in any way that any block device can.

In general, there are no user or software visible changes when encryption is on. Preferably, and as illustrated in FIG. 5, an indication is provided that the archive is encrypted, along with the type of encryption. Preferably, mounted drives go through the device mapper rather than mounting the block device directly, although this is not generally visible. Typically, an encrypted drive must go through the device mapper to be useable.

Preferably, all programs that handle keys disable swap for themselves to eliminate the possibility that key data may end up in a swap partition. It is not required that programs run as root.

Preferably, there are at least several nodes. This is because the secret sharing algorithm requires at least two shares to properly reconstruct and, further, because an encrypted single node is likely to have enough keying information such if the drive were stolen, the attacker could find the key. Keys should be escrowed for emergencies, e.g., where the cluster fails below threshold. Of course, the data is only as secure as the escrowed key, so secure storage of that key is required. If desired, the system may include a key destruction routine or function. Thus, e.g., the system may incorporate a control switch or operation that, upon activation, destroys the key shares (or some of them). The archive is then shut down until the key shares can be restored from backup. Of course, once the key is gone, the archive is not then readable.

There are several variants that may be implemented including, for example, encrypted swap, and encrypting the above-identified programs.

Additionally, it is desired to provide a way to avoid having to re-key the entire archive (or portions thereof) in the event a key is compromised. To address this issue, the system may use an encrypted key architecture, in effect, a session key. In particular, the technique described above joins together the various key shares into a single key, which is the one and only master key. According to this variant, the various shares are joined into a session key, and that session key is then used to decrypt the real key. Once decrypted, the real key is used to mount the disks. The real key then is never seen external to the archive. If there is a compromise of the session key, that key is removed and another session key is generated. A benefit of this approach is that the system can be provided to a user with one session key, but that key then can be changed by the user at will.

The present invention facilitates the provision of an archive management solution that is designed to capture, preserve, manage, and retrieve digital assets. The design addresses numerous requirements: unlimited storage, high reliability, self-management, regulatory compliance, hardware independence, and ease of integration with existing applications. Clusters of commodity hardware running Linux (for example) provide a robust platform and a virtually unlimited archive. The system can scale, e.g., from a few storage node servers to many nodes that store thousands of terabytes of data. The unique architecture ensures that storage capacity can always keep pace with an organization's increasing archive requirements.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

As described above, the request manager component uses the protection manager on inbound writes to archive and also to fulfill policy repair operations when policy violations are detected. While the request manager is preferred, other components of the application may be used to support or provide the protection manager functionality.

Having described the invention, what I now claim is as follows:

1. A data privacy method, comprising:
   providing a cluster comprising a plurality of nodes networked together, wherein each node executes, in a data processor, an instance of an application that provides object-based storage;
   storing split key pieces across the plurality of nodes;
   joining the split key pieces into a session key if a configurable number of the split key pieces are acquired from nodes among the plurality of nodes;
   for each node among the plurality of nodes that provided a split key piece joined to create the session key, using the session key to obtain a second key, and mounting a drive using the second key;
   communicating among each node which that mounted the drive; and
   upon demand, destroying the session key to restrict access to data stored in the cluster.

2. The data privacy method as described in claim 1 further including completing a boot of the cluster.

3. The data privacy method as described in claim 1 further including, at a given node, using a split key piece to encrypt data written to a disk at the given node.

4. The data privacy method as described in claim 1 wherein the session key is associated with a given cipher.

5. The data privacy method as described in claim 1 wherein the session key is not stored to disk.

6. The data privacy method as described in claim 1 wherein the session key is saved to non-swappable memory.

7. The data privacy method as described in claim 1 wherein the number of nodes is at least two.

8. A node in a cluster comprising a plurality of nodes networked together, wherein each node of the cluster executes, in a data processor, an instance of an application that provides object-based storage, wherein split key pieces are shared across the plurality of nodes, comprising:
   a key manager configured to join split key pieces into a session key if a configurable number of the split key pieces are acquired from nodes among the plurality of nodes;
   a drive mounter configured to use the session key to obtain, by decryption, a second key, and to use the second key to mount a drive;
   a network manager configured to communicate, using the session key, among the node and one or more other nodes that each mounted the drive; and
   a key destroyer configured to destroy the session key upon demand to restrict access to data stored in the cluster.

9. The node as described in claim 8 wherein the key manager encrypts data using the split key piece.

10. The node as described in claim 8 wherein the session key is associated with a given cipher.

11. The node as described in claim 8 wherein the session key is not stored to disk.

12. The node as described in claim 8 wherein the session key is saved to non-swappable memory.

* * * * *